(12) United States Patent
Hanna

(10) Patent No.: US 7,753,435 B2
(45) Date of Patent: Jul. 13, 2010

(54) WATER SHIELD FOR VEHICLE DOOR

(75) Inventor: Fadi Hanna, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 101 days.

(21) Appl. No.: 11/944,672

(22) Filed: Nov. 26, 2007

(65) Prior Publication Data

US 2009/0134658 A1 May 28, 2009

(51) Int. Cl.
*B62D 25/04* (2006.01)
(52) U.S. Cl. .................. 296/146.5; 296/146.7
(58) Field of Classification Search ............. 296/146.5, 296/146.7; 280/851
See application file for complete search history.

(56) References Cited

U.S. PATENT DOCUMENTS

| | | | | |
|---|---|---|---|---|
| 2,650,857 A * | 9/1953 | Watter et al. | .................. | 49/502 |
| 2,797,129 A * | 6/1957 | Renno | ......................... | 49/502 |
| 3,568,390 A * | 3/1971 | Swensen et al. | ............ | 52/789.1 |
| 3,696,578 A * | 10/1972 | Swensen et al. | ............ | 52/789.1 |
| 3,796,168 A * | 3/1974 | Zeller | ..................... | 105/377.05 |
| 3,906,073 A * | 9/1975 | Kim et al. | .................... | 264/147 |
| 3,964,208 A * | 6/1976 | Renner et al. | .................. | 49/502 |
| 3,989,429 A * | 11/1976 | Mattson | ........................ | 425/52 |
| 4,246,734 A * | 1/1981 | Fogle et al. | ............... | 52/309.16 |
| 4,328,642 A * | 5/1982 | Presto | ......................... | 49/502 |
| 4,824,162 A * | 4/1989 | Geisler et al. | .......... | 296/100.09 |
| 5,029,942 A * | 7/1991 | Rink | ..................... | 297/452.18 |
| 5,298,694 A * | 3/1994 | Thompson et al. | .......... | 181/286 |
| 5,306,068 A * | 4/1994 | Nakae et al. | ........... | 296/187.12 |
| 5,456,513 A * | 10/1995 | Schmidt | ..................... | 296/39.1 |
| 5,652,415 A * | 7/1997 | Pelzer et al. | ................ | 181/286 |
| 5,857,729 A * | 1/1999 | Bogard | .................. | 296/100.09 |
| 5,904,002 A * | 5/1999 | Emerling et al. | .............. | 49/502 |
| D421,736 S * | 3/2000 | Bogard | ...................... | D12/401 |
| 6,038,911 A * | 3/2000 | Krajewski et al. | .......... | 72/379.2 |
| 6,117,521 A * | 9/2000 | Yoshida et al. | .............. | 428/119 |
| 6,197,403 B1 * | 3/2001 | Brown et al. | ................. | 428/137 |
| D444,762 S * | 7/2001 | Werle et al. | ................ | D12/401 |
| 6,338,520 B2 * | 1/2002 | Rusu et al. | ............. | 296/100.07 |
| 6,546,674 B1 * | 4/2003 | Emerling et al. | .............. | 49/502 |
| 6,581,352 B1 * | 6/2003 | Amirsoleymani | ............ | 52/602 |
| 6,588,826 B1 * | 7/2003 | Muirhead | ............. | 296/100.06 |
| 6,767,049 B1 * | 7/2004 | Morrison et al. | ......... | 296/146.7 |
| 6,857,683 B2 * | 2/2005 | Myers | .................... | 296/100.02 |
| 6,929,303 B1 * | 8/2005 | Sharples | .................... | 296/37.6 |
| 6,997,505 B2 * | 2/2006 | Dry et al. | ................. | 296/146.7 |
| 7,055,887 B2 * | 6/2006 | Williams et al. | ......... | 296/146.7 |
| 7,124,541 B2 * | 10/2006 | Fellner | ........................ | 49/502 |
| 7,316,444 B2 * | 1/2008 | Montagna et al. | ...... | 296/100.02 |
| 7,318,618 B1 * | 1/2008 | Yue | ........................ | 296/100.06 |
| D574,763 S * | 8/2008 | Smith et al. | ................ | D12/401 |
| 2001/0030444 A1 * | 10/2001 | Whitehead et al. | ....... | 296/146.7 |
| 2004/0021342 A1 * | 2/2004 | Fujimoto | ............... | 296/193.11 |
| 2005/0189789 A1 * | 9/2005 | Schmidt | ................ | 296/187.12 |
| 2006/0017306 A1 * | 1/2006 | Smith et al. | .............. | 296/146.7 |
| 2006/0103228 A1 * | 5/2006 | Gupta et al. | ........... | 297/452.65 |
| 2007/0039245 A1 * | 2/2007 | Buchta et al. | ................. | 49/502 |
| 2007/0046064 A1 * | 3/2007 | Winborn | .................. | 296/146.7 |

* cited by examiner

*Primary Examiner*—Kiran B. Patel
(74) *Attorney, Agent, or Firm*—Ralph E. Smith

(57) ABSTRACT

A water shield for a door of a vehicle includes a main body with at least one sealing portion for sealing to the door. The water shield also includes at least one rib coupled to the main body for increasing stiffness of the water shield.

14 Claims, 2 Drawing Sheets

WATER SHIELD FOR VEHICLE DOOR

FIELD

The present invention relates to a water shield and, more particularly, relates to a water shield for a vehicle door.

BACKGROUND

Vehicle doors often include multiple panels that are attached so as to define an internal space within the door. Furthermore, vehicle doors typically include a water shield located within the vehicle door. The water shield seals surfaces inside the door to limit intrusion of water into the vehicle. These water shields are typically flat sheets that are flexible.

These water shields can resonate and/or vibrate against other components inside the vehicle door. For instance, a speaker mounted within the door can generate sound that resonates/vibrates the water shield. More specifically, the water shield can be sealed to the same panel as the speaker, and operation of the speaker can mechanically vibrate the panel and the water shield. Furthermore, the speaker can create acoustic sound waves that travel through the interior space of the door, and these acoustic sound waves can resonate/vibrate the water shield.

This resonation/vibration of the water shield can cause audible buzzing, squeaking, and/or rattling within the door, which can be distracting and annoying to the vehicle occupants.

SUMMARY

A water shield for a door of a vehicle is disclosed that includes a main body with at least one sealing portion for sealing to the door. The water shield also includes at least one rib coupled to the main body for increasing stiffness of the water shield.

A vehicle door is also disclosed for a vehicle that includes a panel and a water shield sealed to the panel to thereby limit intrusion of water into the vehicle. The water shield includes a main body with at least one sealing portion for sealing to the panel and at least one rib coupled to the main body for increasing stiffness of the water shield.

Moreover, a water shield is disclosed for a door of a vehicle. The water shield includes a main body with at least one sealing portion for sealing to the door. The water shield also includes a plurality of elongate ribs integrally coupled to and projecting from the main body for increasing stiffness of the water shield. The plurality of ribs are hollow so as to define a bottom surface that is spaced below a side surface of the main body. The plurality of ribs also differ in longitudinal lengths, and the plurality of ribs have a straight axis that is disposed at a positive, acute angle relative to a horizontal plane defined by the door. Additionally, the ribs are arranged into a plurality of groups relative to the main body, and the groups are separated at a distance from each other.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
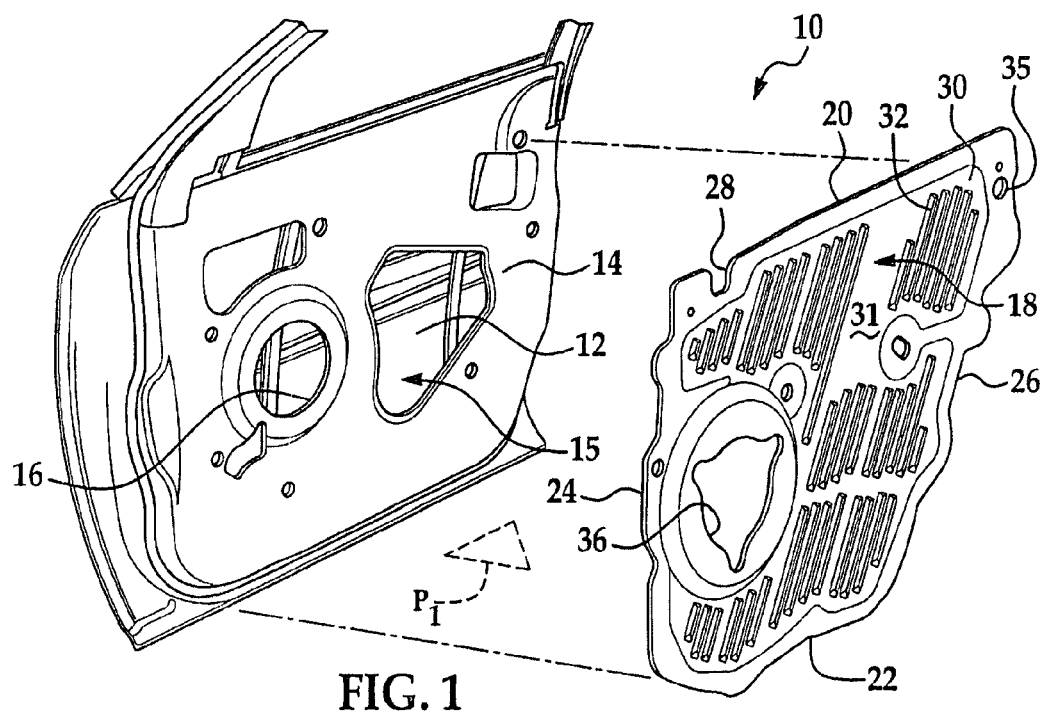
FIG. 1 is an exploded perspective view of a vehicle door.

Referring initially to FIG. 1, a vehicle door 10 is illustrated. The vehicle door 10 can include a plurality of body panels including an exterior panel 12 and an interior panel 14. The interior panel 14 is fixed to the exterior panel 12 so as to define a space 15 therebetween. In one embodiment, the exterior and interior panels 12, 14 are made out of formed sheet metal and each include curved surfaces, apertures, and other necessary features. The interior panel 14 can include a speaker aperture 16 where a stereo system speaker (not shown) can be mounted. Other components of the vehicle can also be mounted to the interior panel 14, such as wires, switches, and the like.

The vehicle door 10 also includes a water shield 18. The water shield 18 is sealed to the interior panel 14 so as to limit the intrusion of water into the vehicle. More specifically, as water slides down off of the window (not shown) into the space 15 between the exterior and interior panels 12, 14, the water shield 18 diverts the flow of the water within the space 15 away from the interior of the vehicle. For instance, the water shield 18 limits the flow of water in the space 15 through the apertures in the interior panel 14 and into the vehicle.

It will also be appreciated that the vehicle door 10 can include a trim panel (not shown), which can be coupled to the interior panel 14. As such, the interior panel 14 and the water shield 18 can be provided between the exterior panel 12 and the trim panel (not shown). It will also be appreciated that the exterior panel 12 defines an exterior surface of the vehicle, and the trim panel (not shown) defines an interior surface of the vehicle. Furthermore, it will be appreciated that the trim panel (not shown) can include a variety of components, such as switches and a door handle, attached thereto.

Figure 2:
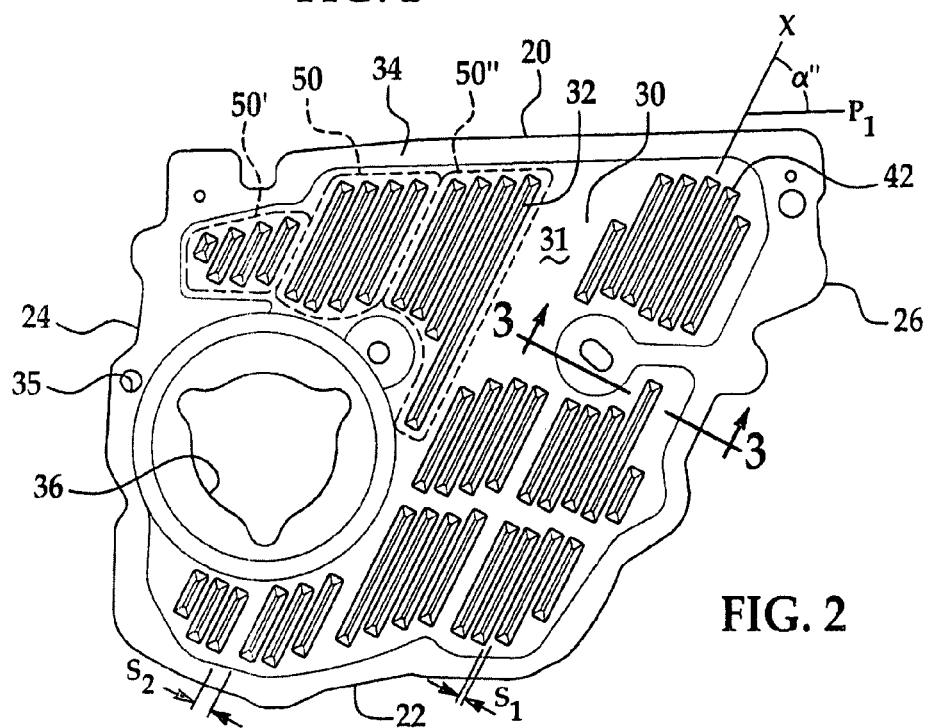
FIG. 2 is a top view of one embodiment of a water shield of the vehicle door.
Figure 3:
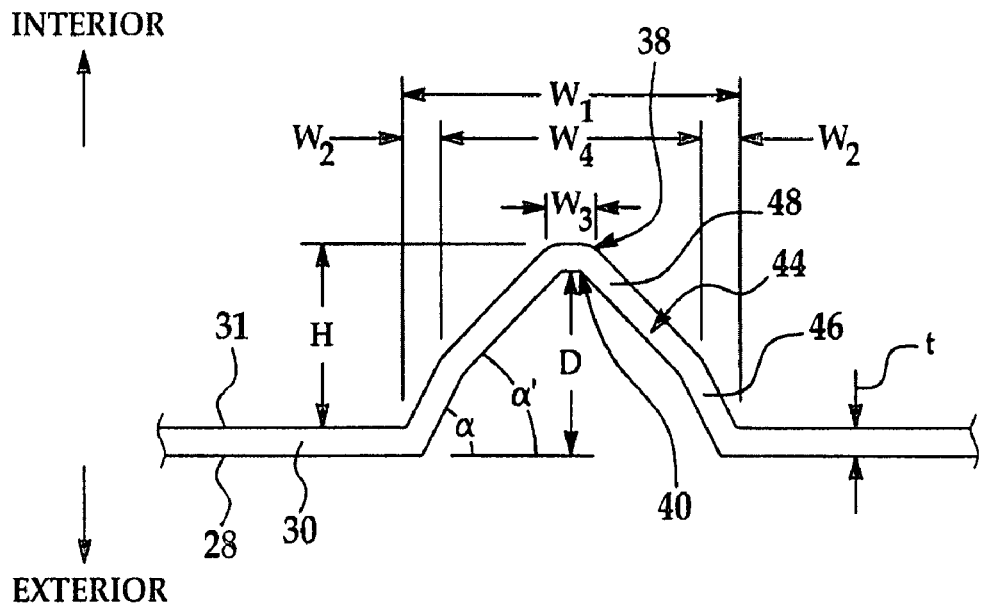
FIG. 3 is a longitudinal cross section view of a portion of the water shield.

Referring now to FIGS. 1-3, the water shield 18 will be discussed in greater detail. The water shield 18 can be thin and sheet-like. The water shield 18 can also be made out of a polymer (e.g., filled polyethylene) so as to be flexible and foldable. In one embodiment, the water shield 18 is made via a molding process (e.g., vacuum form molding).

The water shield 18 defines a top edge 20, a bottom edge 22, a forward edge 24 and a rear edge 26. It will be appreciated that the tope edge 20 is positioned generally toward the top of the vehicle, the bottom edge 22 is positioned generally toward the bottom of the vehicle, the forward edge 24 is positioned generally toward the forward end of the vehicle, and the rear edge 26 is positioned generally toward the rear end of the vehicle. The water shield 18 also defines an exterior side surface 28 and an interior side surface 31, which is opposite to the exterior side surface 28. It will be appreciated that the interior side surface 31 faces the interior of the vehicle, and the exterior side surface 28 faces the exterior of the vehicle. The water shield 18 also has a thickness, t, as shown in FIG. 3.

The water shield 18 generally includes a main body 30 and at least one rib 32. In the embodiment shown, the water shield 18 includes a plurality of ribs 32 that are coupled to the main body 30. Also, in one embodiment, the ribs 32 are integrally coupled to the main body 30. Furthermore, in the embodiment shown, the ribs 32 project from the main body 30 toward the interior of the vehicle. The ribs 32 increase the stiffness of the water shield 18 as will be discussed in greater detail below.

The main body 30 includes a sealing portion 34 for sealing to the interior panel 14 of the door 10. In the embodiment shown, the sealing portion 34 of the main body 30 extends around the entire periphery of the water shield 18. The sealing portion 34 can be sealed to the interior panel 14 with an adhesive or other similar means. It will be appreciated that the sealing portion 34 can be included at any suitable location on the main body 30.

The periphery of the main body 30 can have any appropriate shape, and can be shaped according to the dimensions of the interior panel 14 of the door 10. Also, the main body 30 can include a plurality of apertures 35 including a speaker aperture 36, which is aligned with the speaker aperture 16 of the interior panel 14. The apertures 35 can provide clearance for fasteners, wires, etc., and the speaker aperture 36 can provide clearance for the speaker (not shown) of the door 10. Also, the main body 30 is generally planar, but can include plateaus (e.g., around the speaker aperture 36) and other raised surfaces depending on the surface profile of the interior panel 14.

Referring now to FIGS. 2 and 3, the ribs 32 will be described in greater detail. In the embodiment shown, the ribs 32 are elongate and project from the interior side surface 31 toward the interior of the vehicle. Also, the ribs 32 are generally hollow and triangular in cross section as shown in FIG. 3. More specifically, in the embodiment shown, the ribs 32 define a top surface 38 that is spaced at a first distance, H, above the interior side surface 31 of the main body 30. Also, in the embodiment shown, the ribs 32 define a bottom surface 40 that is spaced at a second distance, D, below the exterior side surface 28 of the main body 30.

In the embodiment shown in FIG. 3, the ribs 32 each define a pair of opposed longitudinal sides 44 that project away from the main body 30 and are coupled so as to define the top and bottom surfaces 38, 40. In one embodiment, the longitudinal sides 44 each include a base section 46 and an upper section 48. The base sections 46 are coupled to the main body 30. The upper sections 48 are coupled to the respective base section 46, and are spaced from the main body 30. The base section and upper sections 46, 48 project away from the main body 30 at different angles relative to the main body 30. In the embodiment shown, the base section 46 is disposed at a greater acute angle, $\alpha$, than the angle, $\alpha'$, of the respective upper section 48 relative to the main body 30 (i.e., $\alpha > \alpha'$).

Also, the ribs 32 define opposed ends 42 at each end of the longitudinal sides 44. In the embodiment shown, the ends 42 are triangular in shape.

Referring to the embodiment shown in FIG. 3, the total width, $w_1$, of each rib 32 is approximately 18 mm. More specifically, the width of each base section 46, $w_2$, is approximately 1.5 mm, the width of the upper sections 48 and top surface 38, w4, is approximately 15 mm, and the width of the top surface 38, $w_3$, is approximately 3 mm. Moreover, the height, H, and depth, D, are both approximately 15 mm. It will be appreciated that the ribs 32 can have any suitable dimensions. Also, the dimensions of the ribs 32 could vary throughout the water shield 18.

Referring back to FIG. 2, it is noted that each rib 32 defines a longitudinal straight axis, X. Each of the axes, X, are parallel to each other. However, the axes, X, can be curved and/or the axes, X, can be non-parallel. Also, as shown in FIGS. 1 and 2, the door 10 defines a horizontal plane, $P_1$. It will be appreciated that the horizontal plane, $P_1$, is generally parallel to the wheel base of the vehicle. As shown in FIG. 2, the axes, X, of the ribs 32 are disposed at a positive, acute angle, $\alpha''$, relative to the horizontal plane $P_1$. In one embodiment, the angle, $\alpha''$, is approximately 45 degrees. This arrangement causes the water shield 18 to maintain desired stiffness.

The ribs 32 differ in longitudinal length as shown in FIG. 2. However, the ribs 32 could be of equal longitudinal length.

As shown in FIG. 2, in the direction of the axis, X, from the top edge 20 to the bottom edge 22 of the water shield 18, at least two ribs 32 bisect the water shield 18. In other words, at least two ribs 32 are approximately aligned along the axial direction, X, and these ribs 32 extend longitudinally between the top edge 20 and the bottom edge 22.

Also, the ribs 32 are arranged into a plurality of groups, 50, 50', 50" on the main body 30. In FIG. 2, the groups, 50, 50', 50" are designated by respective broken lines that enclose the respective group. The ribs 32 in each group 50, 50', 50" are equally spaced from each other by a distance, $S_1$. In one embodiment, the spacing, $S_1$, is approximately 7 mm. Also, each group 50, 50', 50" is separated at a distance from its neighboring group 50, 50', 50", by a distance, $S_2$. In one embodiment, the distance, $S_1$, between the ribs 32 of individual group 50, 50', 50" is less than the distance, $S_2$, between neighboring groups 50, 50', 50" (i.e., $S_1 < S_2$). Also, in the embodiment shown, some groups 50, 50', 50" include at least two neighboring ribs 32 with aligned ends 42. In other groups 50, 50', 50", at least two ends 42 of neighboring ribs 32 are misaligned from each other.

It will be appreciated that the dimensions and features of the ribs 32 add stiffness to the water shield 18. More specifically, the elongated shape, the projected height, H, the depth, D, and other dimensions of the ribs 32 increase the stiffness of the water shield 18. Furthermore, as shown in FIG. 3, because the longitudinal sides 44 of the ribs 32 include the base and upper sections 46, 48, that project at decreasing angles, $\alpha$, $\alpha'$, away from the main body 30, the ribs 32 can better distribute loads on the water shield 18. Accordingly, the water shield 18 is less likely to vibrate and/or resonate to thereby decrease buzzing, squeaking, and/or rattling of the water shield 18.

Also, the arrangement of the ribs 32 on the main body 30 increases stiffness of the water shield 18. More specifically, the angle, $\alpha''$, of the ribs 32 reduces flexion and deformation of the ribs 32, and the arrangement of the ribs 32 into groups 50, 50', 50", reduces flexion and deformation of the ribs 32.

It will be appreciated that the pattern of the ribs can be designed according to the predetermined direction of sound wave propagation from the speaker (not shown). For instance, in the embodiment shown, the embodiment shown, the ribs 32 are generally concentrated in areas where the water shield 18 covers apertures and openings in the interior panel 14 of the door 10. In other words, the ribs 32 are generally concentrated on the water shield 18 over the apertures of the interior panel 14. Sound waves generally concentrate and propagate through these apertures. Thus, the water shield 18 has increased stiffness in these areas to thereby resist vibration/ resonation. In other words, the ribs 32 improve acoustic baffling by isolating the front-to-back sound waves from the speaker.

Also, during assembly of the door 10, the water shield 18 is often folded and/or flexed by an assembly worker such that a fold in the water shield 18 extends horizontally, parallel to the plane $P_1$, and/or vertically, perpendicular to the plane $P_1$. However, the angle, $\alpha''$, and the arrangement of the ribs 32 allows for better distribution of the load because multiple ribs 32 are flexed by such folding instead of a single rib 32. Therefore, the ribs 32 are more likely to remain stiff and resilient throughout the assembly process.

Figure 4:
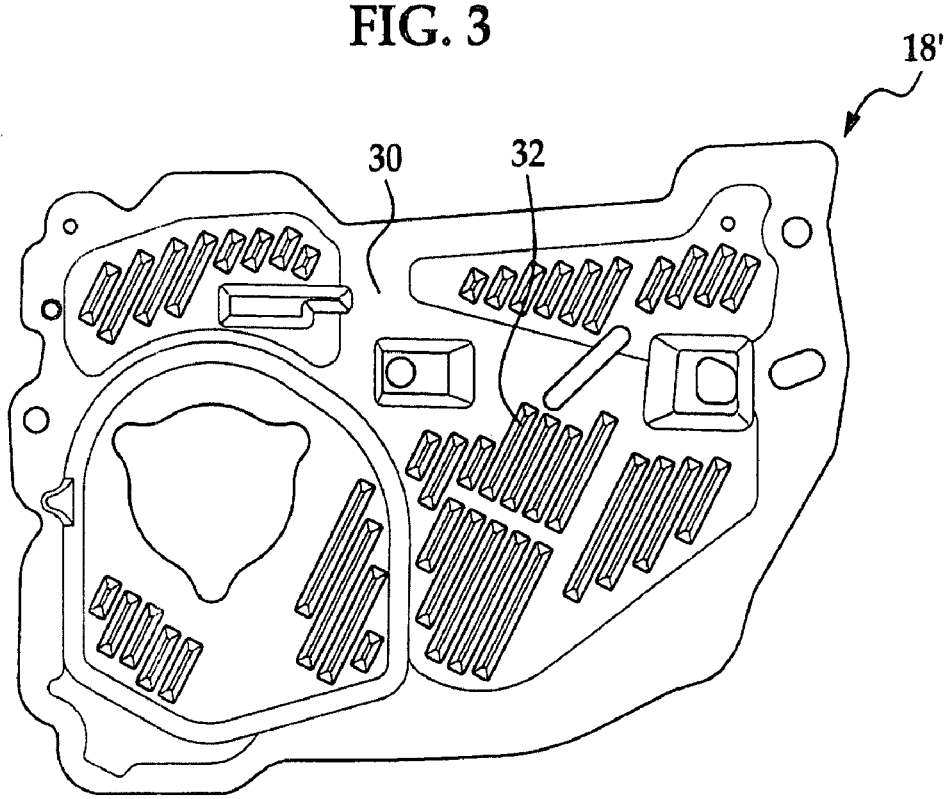
FIG. 4 is a top view of another embodiment of a water shield of the vehicle door.

Referring now to FIG. 4, another embodiment of the water shield 18' is shown. The water shield 18' is significantly similar to the water shield 18 illustrated in FIGS. 1-3. The water shield 18' includes a main body 30 and a plurality of ribs 32. The overall shape of the main body 30 is different from that of the embodiment of FIGS. 1-3. Also, the pattern and arrangement of the ribs 32 is different than the embodiment shown in FIGS. 1-3. In one embodiment, the water shield 18 of FIGS. 1 and 2 is intended for a rear door of a vehicle, and the water shield 18' of FIG. 4 is for a front door of a vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A water shield for a door of a vehicle comprising:
   a main body with at least one sealing portion for sealing to the door, the main body including an edge; and
   a plurality of ribs that are coupled to the main body for increasing stiffness of the water shield, all of the plurality of ribs of the water shield having a straight axis that extends at a positive, acute angle relative to the edge, wherein the plurality of ribs are arranged in at least a first group of ribs and a second group of ribs, the plurality of ribs in the first group being spaced apart from adjacent ribs in the first group by a first distance, the plurality of ribs in the second group being spaced apart from adjacent ribs in the second group by the first distance, the first group being spaced apart from the second group by a second distance that is greater than the first distance.

2. The water shield of claim 1, the plurality of ribs each being integrally coupled to the main body.

3. The water shield of claim 1, the plurality of ribs each projecting from the main body.

4. The water shield of claim 3, wherein the main body defines a first side surface and a second side surface opposite to the first side surface, the plurality of ribs each including a top surface that is spaced at a first distance above the first side surface, the plurality of ribs each also including a bottom surface that is spaced at a second distance below the second side surface.

5. The water shield of claim 1, wherein the plurality of the ribs differ in longitudinal lengths.

6. The water shield of claim 1, wherein at least one of the plurality of ribs includes a cross section that is transverse to the respective axis, the cross section including a plurality of sections that project away from the main body at different angles relative to the main body.

7. The water shield of claim 6, the at least one rib including a base section and an upper section, the base section coupled to the main body and the upper section coupled to the base section and spaced from the main body, the base section disposed at a greater acute angle than that of the upper section relative to the main body.

8. The water shield of claim 1, wherein the main body defines a first edge and a second edge generally opposite to the first edge, and comprising at least two ribs that are approximately aligned and extend longitudinally between the first edge and the second edge.

9. The water shield of claim 1, wherein at least one of the plurality of ribs includes a pair of longitudinal sides that are joined at an apex, and wherein the at least one of the plurality of ribs includes at least one triangular end that is disposed at an acute angle relative to the main body, the at least one triangular end tapering in width from the main body to the apex.

10. The water shield of claim 1, at least two of the plurality of ribs each including an end, the ends misaligned from each other.

11. The water shield of claim 1, wherein the axes of the plurality of ribs are parallel to each other.

12. The water shield of claim 1, wherein the sealing portion extends about substantially all of an outer periphery of the water shield to enclose the plurality of ribs.

13. The water shield of claim 12, wherein the sealing portion defines a plane, and wherein the plurality of ribs extend away from the plane.

14. The water shield of claim 1, wherein the plurality of ribs are detached from the door.

* * * * *